(12) United States Patent
Griffin et al.

(10) Patent No.: US 8,422,948 B2
(45) Date of Patent: Apr. 16, 2013

(54) MOBILE WIRELESS COMMUNICATIONS DEVICE INCLUDING WIRELESS-BASED AVAILABILITY DETECTOR AND ASSOCIATED METHODS

(75) Inventors: Jason Tyler Griffin, Kitchener (CA); David Ryan Walker, Waterloo (CA); Karim Gillani, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 268 days.

(21) Appl. No.: 12/885,067

(22) Filed: Sep. 17, 2010

(65) Prior Publication Data

US 2012/0071087 A1  Mar. 22, 2012

(51) Int. Cl.
*H04B 5/00* (2006.01)

(52) U.S. Cl.
USPC .......................... 455/41.1; 455/41.2; 455/41.3

(58) Field of Classification Search ........ 455/41.1–41.3, 455/404.2, 456.1, 456.3, 456.6, 500, 556.2, 455/557
See application file for complete search history.

(56) References Cited

U.S. PATENT DOCUMENTS

| 7,212,827 | B1 * | 5/2007 | Veschl ........................ 455/456.1 |
| 2005/0021773 | A1 | 1/2005 | Shiga et al. .................... 709/228 |
| 2011/0306304 | A1 * | 12/2011 | Forutanpour et al. ...... 455/67.11 |

FOREIGN PATENT DOCUMENTS

| WO | 2009146250 | 12/2009 |
| WO | 2010018468 | 2/2010 |

* cited by examiner

*Primary Examiner* — Tuan H Nguyen
(74) *Attorney, Agent, or Firm* — Allen, Dyer, Doppelt, Milbrath & Gilchrist, P.A.

(57) ABSTRACT

A wireless communications system includes a wireless communications network and a plurality of wireless communications devices. The wireless communications devices are each configured to communicate via the wireless communications network. At least one of the plurality of wireless communications devices has a portable housing, a wireless transceiver carried by the portable housing, and a wireless-based, availability detector carried by the portable housing. A processor is carried by the portable housing and is configured to determine a first availability status based upon the NFC device at a first time. The processor is further configured to activate the wireless-based, availability detector based upon the NFC device to thereby determine a second availability status based upon the wireless-based, availability detector at a second time after the first time. The processor is additionally configured to communicate the first and second availability status to the wireless communications network via the wireless transceiver.

21 Claims, 7 Drawing Sheets

MOBILE WIRELESS COMMUNICATIONS DEVICE INCLUDING WIRELESS-BASED AVAILABILITY DETECTOR AND ASSOCIATED METHODS

TECHNICAL FIELD

This application relates to the field of wireless communications, and more particularly, to wireless communications devices that communicate an availability status to their respective wireless networks and associated methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow users to send and receive electronic mail (email) messages wirelessly and access the internet via a cellular network and/or a wireless local area network (WLAN), for example. In addition, these devices may allow users to send Short Messaging Service (SMS) messages, Personal Identification Number (PIN) messages, and instant messages.

In some situations, a sender may desire a quick answer or response to a message that the sender has sent to a recipient, but may not receive it in a timely fashion because the recipient was unavailable. Had the sender known of the recipient's unavailability to provide a quick answer before sending the message, the sender may have chosen to not send the message, or may have chosen to contact the recipient via in alternate method (i.e. send an e-mail instead of a SMS or PIN message), which would have saved time and effort.

While some devices allow a user to manually set an availability status to be broadcast to the wireless network (which in turn broadcasts it to that user's contacts) via a keypad or trackball, somewhat alleviating the above situation by informing the user's contacts of the user's availability status, situations may occur where the user forgets (or does not have the time) to manually update their availability status.

Therefore, further improvements in wireless communications devices capable of communicating an availability status to the wireless network are desirable.

DETAILED DESCRIPTION

Different embodiments will now be described more fully hereinafter with reference to the accompanying drawings, in which various embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout, and prime notation is used to indicate similar elements in different embodiments.

Generally speaking, a wireless communications system may comprise a wireless communications network and a plurality of wireless communications devices, each configured to communicate via the wireless communications network. At least one of the plurality of wireless communications devices may comprise a portable housing, a Near Field Communications (NFC) device, and a wireless transceiver carried by the portable housing. A wireless-based, availability detector, such as a user-availability detector, may be carried by the portable housing. A processor may be carried by the portable housing, and may be configured to determine a first availability status based upon the NFC device at a first time. The processor may also be configured to activate the wireless-based, availability detector based upon the NFC device to thereby determine a second availability status based upon the wireless-based, availability detector at a second time after the first time. The processor may be further configured to communicate the first and second availability statuses to the wireless communications network via said wireless transceiver.

The wireless communications network may be configured to communicate the first and second availability statuses to at least one other wireless communications devices. In addition, the wireless communications network may be configured to communicate the first and second availability statuses to a social networking site. There may be at least one NFC tag cooperating with the NFC device carried by the portable housing so that the first availability status is based upon proximity between the at least one NFC tag and the NFC device carried by the portable housing.

The wireless-based, availability detector may be a Global Positioning Satellite (GPS) receiver so that the second availability status is based upon at least one geospatial position of the wireless communications device. In addition, the at least one wireless communications device may include at least one input device carried by the portable housing, and the wireless-based, availability detector may be configured to cooperate with the at least one input device to permit association of the at least one geospatial position with the second availability status.

The wireless-based, availability detector may also be a Bluetooth™ device. The wireless communications network may include at least one other Bluetooth™ device cooperating with the Bluetooth™ device so that the second availability status is based upon a communications link therebetween.

An accelerometer may be carried by the housing and may be coupled to the processor. The processor may also be configured to determine the second availability status based upon the accelerometer.

A method aspect is directed to a method of using a wireless communications device comprising a processor, and a wireless transceiver, a Near Field Communications (NFC) device, and a wireless-based availability detector coupled thereto. The method includes determining, using the processor, a first availability status based upon the NFC device at a first time. The method also includes activating, using the processor, the wireless-based, availability detector based upon the NFC device to thereby determine a second availability status based upon the wireless-based, availability detector at a second time after the first time. The method further includes communicating the first and second availability statuses to a wireless communications network via the wireless transceiver.

Figure 1:
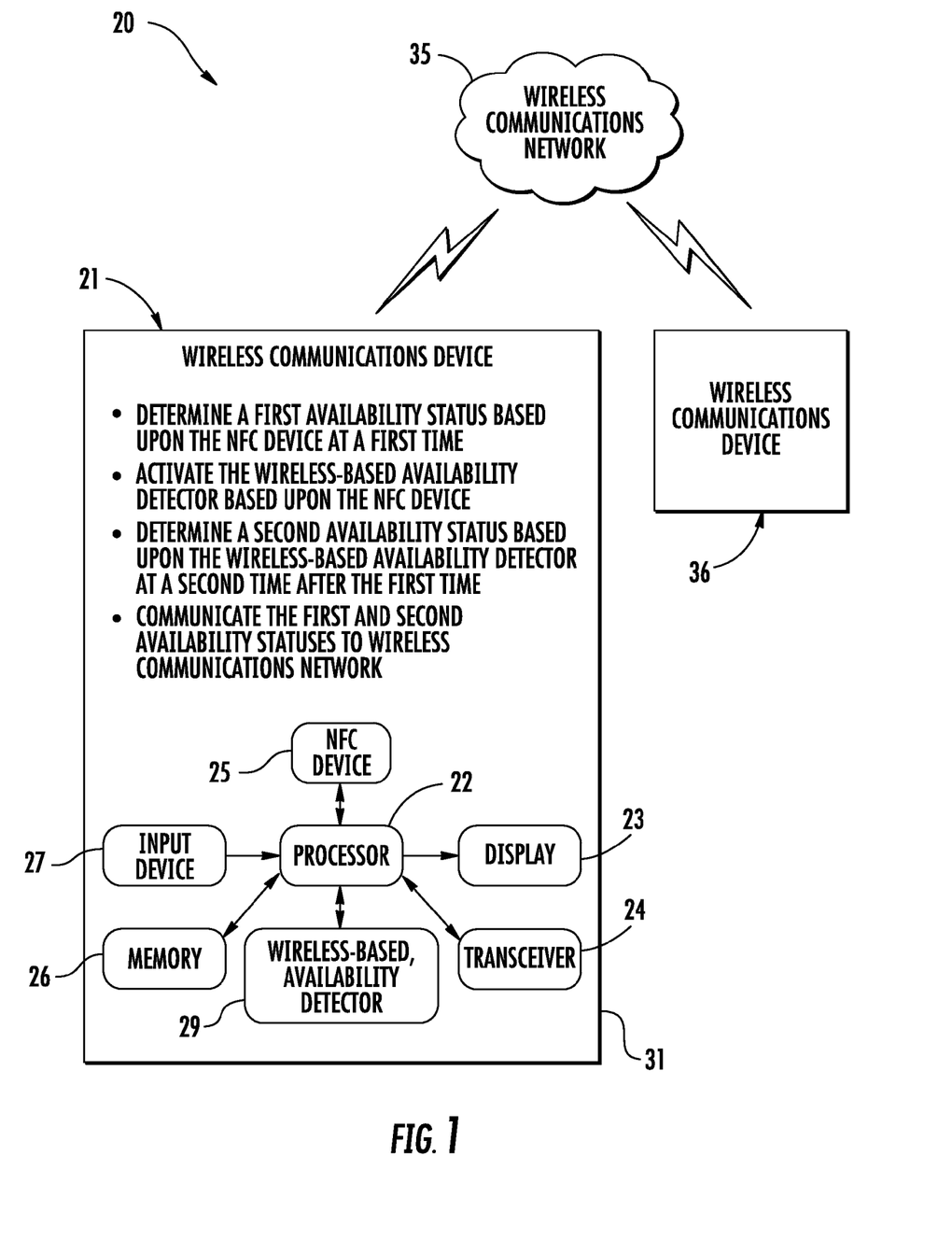
FIG. 1 is a schematic block diagram of a wireless communications system in accordance with the present disclosure.

Referring initially to FIG. 1, a wireless communications system 20 is now described. The wireless communications system 20 includes a wireless communications network 35 and first and second wireless communications devices 21, 36, each configured to communicate via the wireless communications network. The wireless communications network 35 may comprise a cellular network capable of both voice and data transmission.

The first wireless communications device 21 includes a portable housing 31, a transceiver 24 (e.g. a wireless transceiver), and a Near Field Communications (NFC) device 25 carried by the portable housing. A wireless-based, availability detector 29 is carried by the portable housing 31, in addition to a memory 26, an input device 27, and a display 23.

The memory 26 may comprise volatile memory, such as RAM, or non-volatile memory, such as flash RAM or a hard drive. The input device 27 may comprise a keyboard, a thumbwheel, trackpad, or a trackball, for example. The input device 27 may also comprise a microphone. In some applications, the display 23 may comprise a touch sensitive screen and may therefore also serve as the input device 27 (or as an additional input device).

A processor 22 is carried by the portable housing 31 and is configured to determine a first availability status, such as a user-availability status, based upon the NFC device 25 at a first time. The processor 22 then activates the wireless-based availability detector 29 based upon the NFC device, and thereby determines a second availability status, such as a user-availability status, based upon the wireless-based availability detector 29 at a second time after the first time. By this, it is meant that the wireless-based availability detector 29 is activated in response to activation of the NFC device 25.

The processor 22 is further configured to communicate the first and second availability statuses to the wireless communications network 35 via the wireless transceiver 24. By "wireless-based," it is meant that the user availability detector 29 is used by the processor 22 to determine availability based upon a wireless communication between the wireless-based user availability detector 29 and another device.

It should be understood that availability may refer to user availability with respect to any number of clients or applications, such an e-mail account, instant messaging client, social networking client, or a calendar client associated with the wireless communications device 21, for example. Availability may also refer to user availability with respect to one or more user contacts. In some applications, availability may also refer to device availability with respect to any number of clients or applications, as well as device availability with respect to one or more user contacts.

The wireless network 35 then illustratively selectively communicates the first and second availability statuses to the second wireless communications device 36 at the first and second times, respectively; however, the wireless network may also selectively communicate the availability status to any number of wireless communications devices, wireless or wired.

This advantageously allows a user of the second wireless communications device 36 to be aware of whether other users are available for messaging, such as SMS messaging, or to receive phone calls. Further, this allows a user of the first wireless communications device 21 who wishes his availability status to be broadcast to do so. This broadcasting of the availability status may reduce traffic on the wireless communications network 35 by decreasing call volume, for example, or by precluding similar messages from being sent via multiple message methods.

Figure 2:
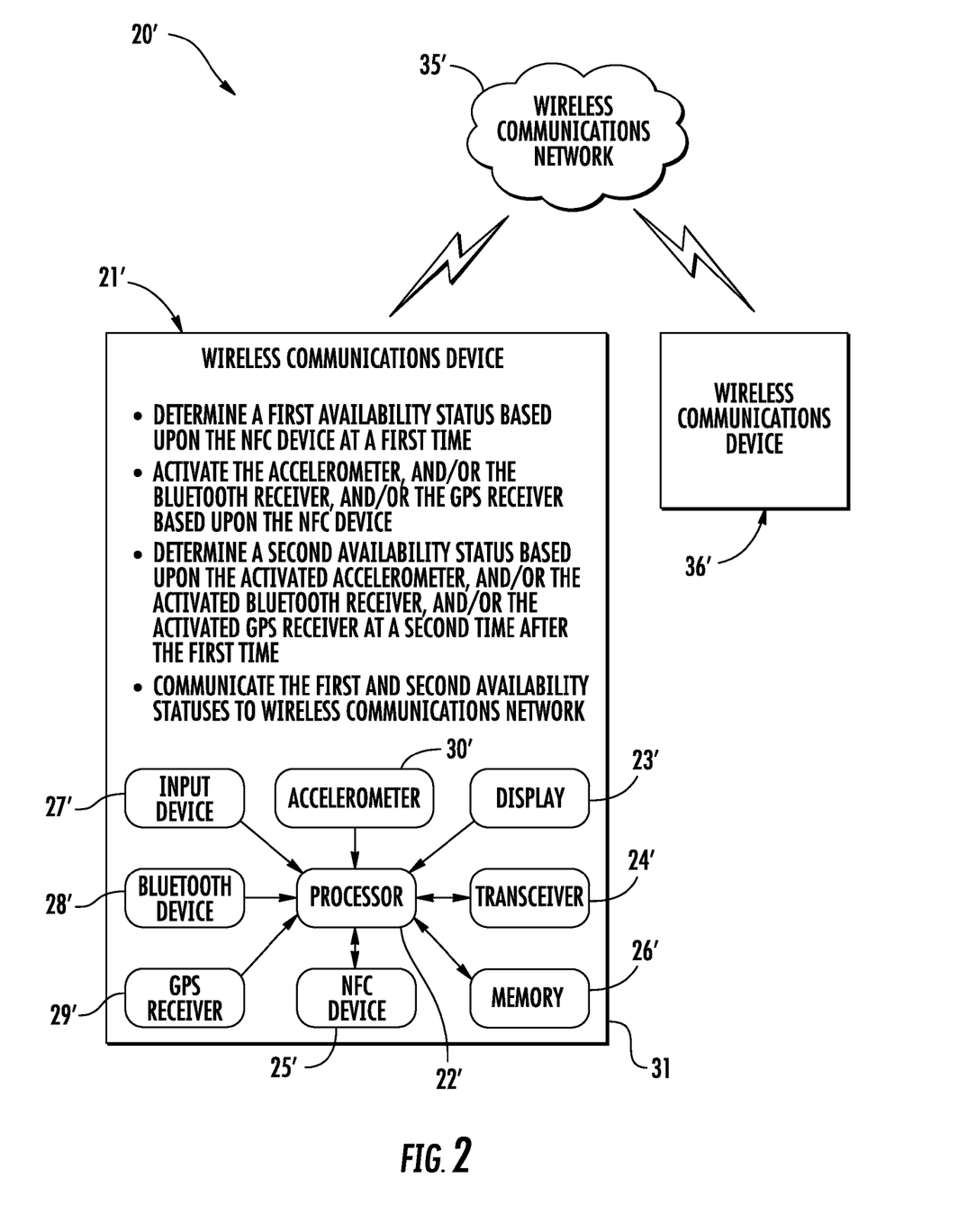
FIG. 2 is a schematic block diagram of another embodiment of a wireless communications system in accordance with the present disclosure.
Figure 5:
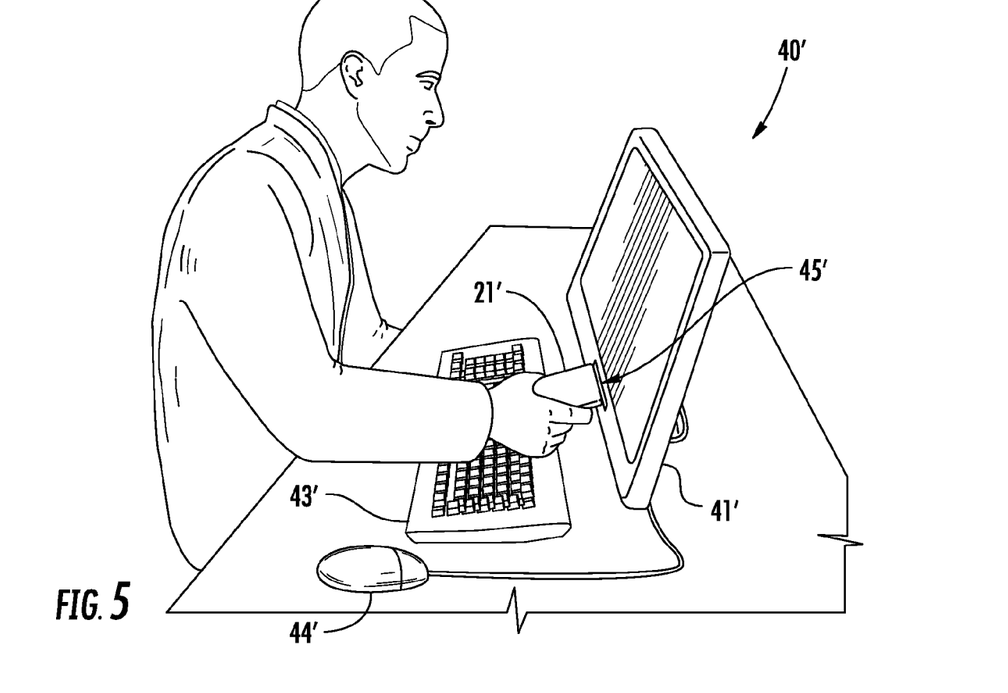
FIG. 5 is a front view of a first wireless communications device of FIG. 2 communicating with a computer workstation via a NFC connection.
Figure 6:
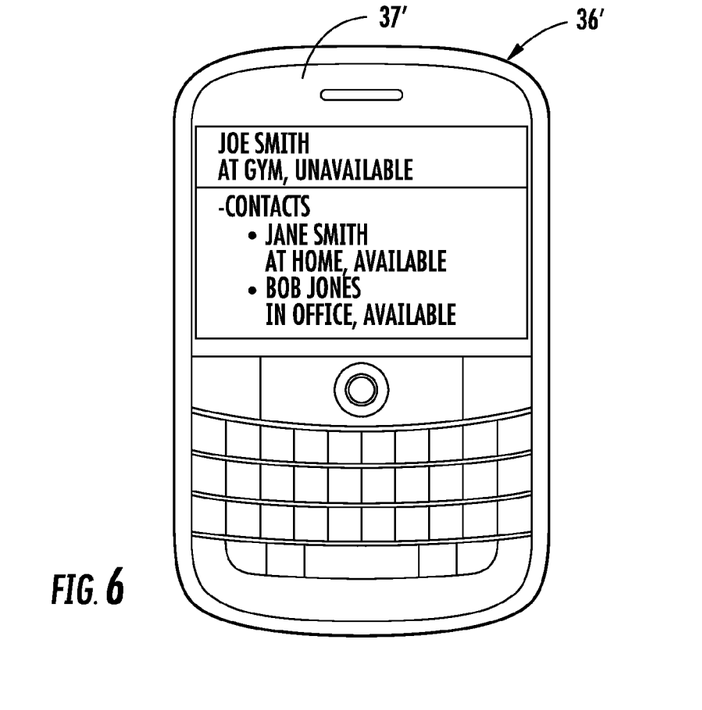
FIG. 6 is a front view of a second wireless communications device of FIG. 2 displaying an availability status message based upon the NFC connection between the first wireless communications device and the computer workstation.

With additional reference to FIGS. 2, 5, and 6, the NFC device 25' cooperates with a NFC tag 45' so that the first availability status is based upon an initial proximity therebetween. As illustrated in FIG. 5, the NFC tag 45' is affixed to a workstation 40'. When the first wireless communications device 21' is positioned adjacent the NFC tag 45', the first availability status is set and communicated to the wireless communications network 35', which in turn communicates it to the second wireless communications device 36' (FIG. 6). The second wireless communications device 36' is displaying on its display 37' the availability status of Bob Jones, who is using the first wireless communications device 21'.

Here, the availability status is "In Office, Available." It should be noted that different NFC tags 45' may be associated with different availability statuses. For example, the workstation 40' (or the desk upon which it rests, or any other surface) may carry multiple NFC tags 45', each associated with a different availability status. A desired availability status may thus be communicated to the wireless communications network 35' by briefly placing the wireless communications device 21' adjacent the appropriate NFC tag 45'. Additionally, when the first wireless communications device 21' is positioned adjacent to the NFC tag 45', the wireless-based availability detector 29' is activated. The wireless-based availability detector 29' is used to detect when the current first availability status is no longer relevant and uses the second availability status to notify the second wireless communications device 36' of this change. The second availability status may clear the current status, or revert to a default availability status.

Continuing with the above example, when the first wireless communications device 21' is positioned adjacent to the NFC tag 45' a Bluetooth link was established between the first wireless communications device 21' and the workstation 40' by the wireless-based availability detector 29. When the first wireless communications device 12' is moved out of Bluetooth communication range, the Bluetooth link is broken thus updating the second availability status to indicate the first wireless communications device 21', or the user thereof, is "Out of the Office", which is communicated to the second wireless communications device 36' (FIG. 6).

The wireless communications devices 21', 36' may alter operation of applications being executed thereby based upon the availability statuses. For example, a user of the wireless communications device 36' may have a 9:00 AM calendar meeting scheduled with a user of the wireless communications device 21'. If, at 9:00 AM, the wireless communications device 36' is in proximity to the wireless communications device 21', the wireless communications device 36' may not display a meeting reminder, as the proximity with the wireless communications device 21' may indicate that both users have met and are conducting the meeting.

Similarly, NFC tags may be placed on common items in an office, such as a desk telephone or fax machine, such that the wireless communications device 21' "knows" when it is in the office. This may be used to change the behavior of the wireless communications device 21', or of other devices in the office. For example, if the wireless communications device 21' has a calendar meeting set for 9:00 AM, the wireless communications device may communicate with the desk telephone via Bluetooth or a wireless network to instruct the desk telephone to deactivate its ringer during the meeting.

In addition, other devices in the office may recognize the wireless communications device 21' and may change their behavior based upon proximity therewith. For example, a time clock may "punch" a user in when the wireless communications device 21' is nearby for the first time that day.

Figure 9:
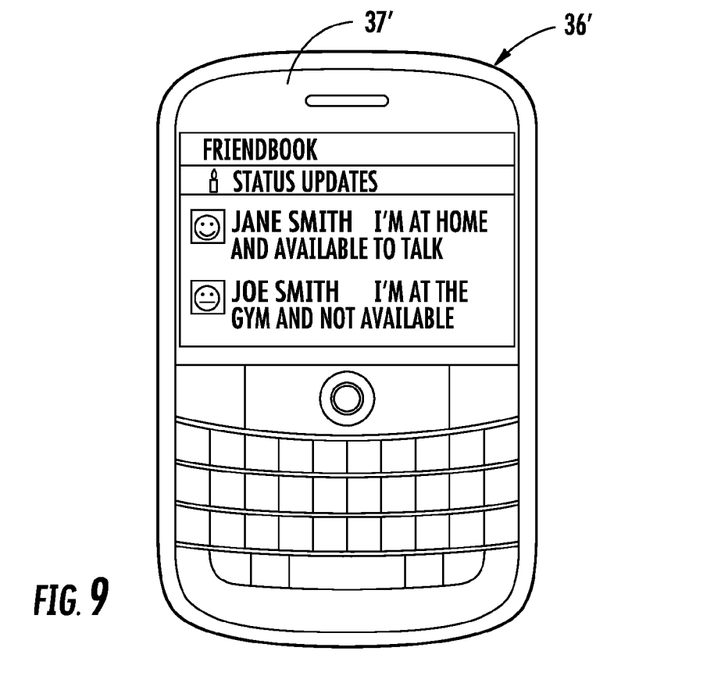
FIG. 9 is a front view of the second wireless communications device of FIG. 2 displaying an availability status message, via a social networking site, based upon the geospatial location of the first wireless communications device.

In some applications, the first wireless communications device 21' may transmit the first and second availability statuses, via the wireless communications network 35', to a social networking site such as Facebook™, Twitter™, or MySpace™, etc. The first and second availability statuses may also be transmitted to messaging applications, such as Blackberry Messenger™, Yahoo Messenger™, AOL Instant Messenger™, and Google Talk™. The second mobile wireless communications device 36' may then access the social networking site, and display the availability status as received via the social networking site. For example, the mobile wireless communications device 36' of FIG. 9 is displaying a social networking site, and, in particular, the status updates of contacts on that social networking site. Here, the availability status for Jane Smith is displayed, and states "I'm at home and available to talk." Likewise, the availability status for Joe Smith is displayed, and states that "I'm at the gym and not available."

The broadcasting of the availability status to a social networking site can be particularly advantageous because such social networking sites may be accessed via computer, and do not require a mobile wireless communications device. In addition, some contacts on a social networking site may not have the telephone number of the mobile wireless communications device 21', yet can still learn the availability status. Further, some users update one or more social networking sites multiple times daily, and this functionality could make the process of performing those updates easier.

In one non-limiting example, the NFC device 25' and NFC tag 45' each include a magnet and an environment sensor such as a Hall Effect sensor. Each is matched in a single touch or gesture, also termed a "kiss" gesture because the wireless communications device 21' and the NFC tag 45' typically touch or "kiss" each other or in adjacent proximity. An example could be in the range of approximately less than 10 or approximately 20 mm, depending on the strength of the magnets, and in one example, when it is about 7 mm or less from the tag or wireless communications device 21'. For example, during this kiss gesture, the NFC device 25' detects the magnet of the NFC tag 45' via the Hall Effect, and a signal or voltage variation from the Hall Effect sensor is transmitted to the processor 22', which activates an NFC communications link between the NFC device 25' and the NFC tag 45'.

An advantage of such system that uses the Hall Effect to initiate a NFC communications link is that such a configuration is more power efficient than leaving the NFC device 25' "on" prior to initiation of the NFC communications link. When the wireless communications device 21' determines the presence of another magnet such as on the NFC tag 45', the processor 22' will trigger the initiation of a wireless NFC connection. An additional benefit is that the Hall Effect generally requires adjacent proximity, meaning that a deliberate "gesture" is involved, such as touching the two communications devices together. This avoids accidental or invasive connections when other NFC enabled devices are in the area. In various embodiments, the Hall Effect need not be utilized and that the wireless-based, availability detector 25' may function using a NFC communications link.

NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

Figure 7A:
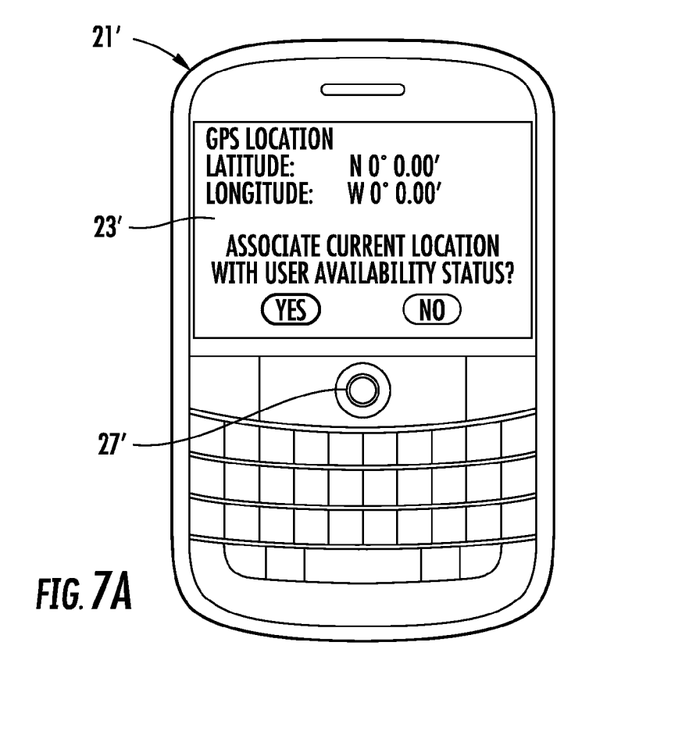
FIG. 7A is a front view of a first wireless communications device of FIG. 2 communicating with a GPS transmitter and associating the geospatial location of the wireless communications device with a user availability status.
Figure 7B:
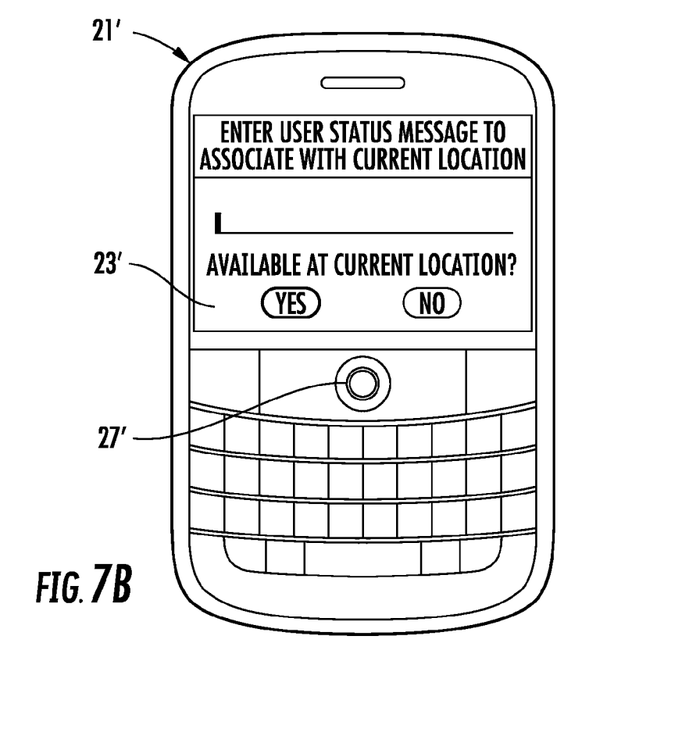
FIG. 7B is a front view of the wireless communications device of FIG. 7A communicating with a GPS transmitter and associating a user status message with the geospatial location of the wireless communications device.

Referring again to FIG. 2 and additionally to FIGS. 7A-7B, the wireless-based, availability detector may comprise a Global Positioning Satellite (GPS) receiver 29' so that the second availability status is based upon a geospatial position of the wireless communications device 21, although it may be other devices. In addition, the first wireless communications device 21' and GPS receiver 20' may be configured to permit association of the one geospatial position with a given availability status via the input device 27'. For example, the first wireless communications device 21' may display its current geospatial location on the display 23', and query the user whether the current geospatial location should be associated with a user availability status (FIG. 7A). The first wireless communications device 21' may then query the user as to a status message to associate with the current location, and whether a availability status of available or unavailable should be associated with the current location (FIG. 7B). This enables the first wireless communications device 21' to update the availability status as the first wireless communications device 21' moves around. By configuring the wireless communications device 21' as shown in FIGS. 7A-7B, the desired availability status for a given geospatial location is transmitted to the wireless communications network 35' without further input required from a user.

Figure 8:
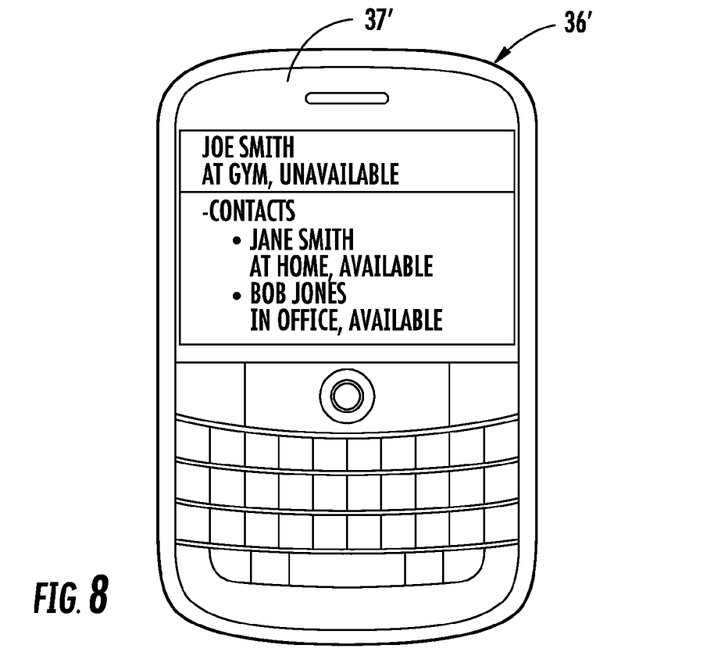
FIG. 8 is a front view of the second wireless communications device of FIG. 2 displaying an availability status message based upon the geospatial location of the first wireless communications device.

The second wireless communications device 36' in FIG. 8 is displaying the availability of Bob Jones on its display 37' as "In Office, Available," based upon the geospatial location of Bob Jones's wireless communications device, the first wireless communications device 21'. It should be understood that the status message may be a more detailed description of the availability or unavailability, for example stating "At Gym," "At Home," "In Car," or "In Office," (FIG. 8).

Figure 3:
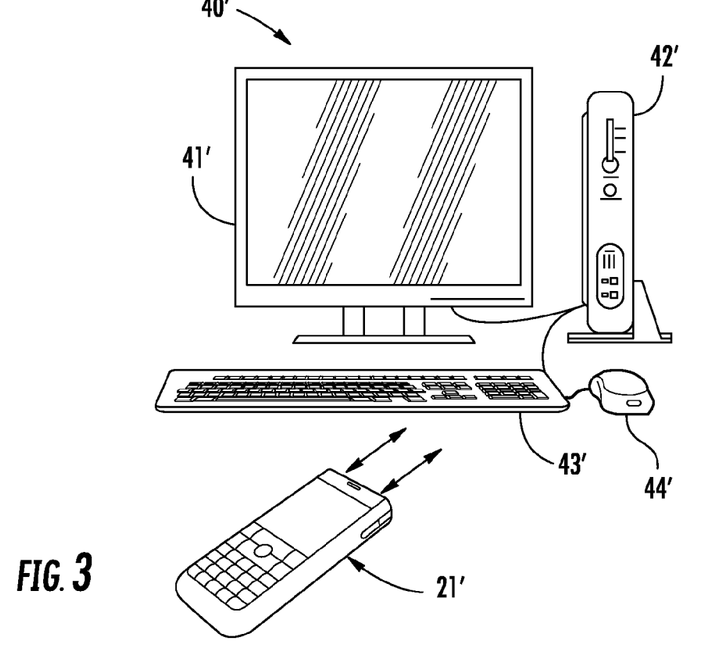
FIG. 3 is a front view of a first wireless communications device of FIG. 2 communicating with a computer workstation via a Bluetooth™ connection.
Figure 4:
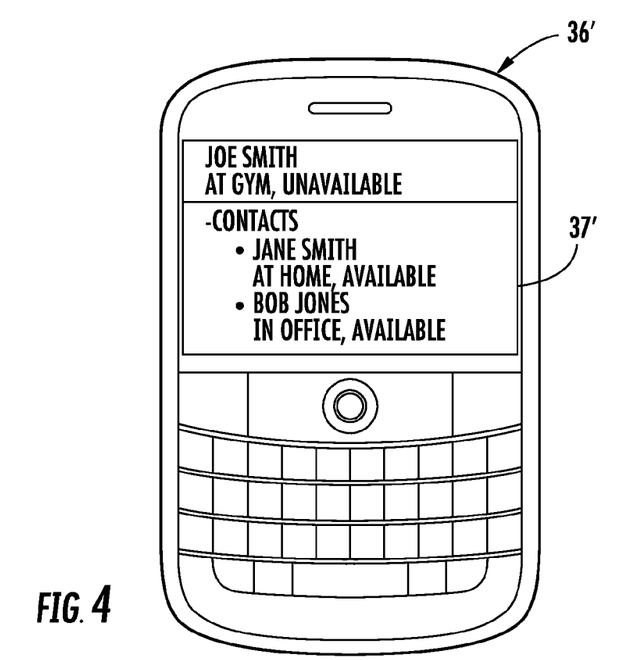
FIG. 4 is a front view of a second wireless communications device of FIG. 2 displaying an availability status message based upon the Bluetooth™ connection between the first wireless communications device and the computer workstation.

Referring again to FIG. 2 and additionally to FIG. 3, the wireless-based, availability detector may also comprise a Bluetooth™ device 28'. The wireless communications network 35' may include a Bluetooth™ device carried within the housing 42' of the workstation 40' that cooperates with the Bluetooth™ device 28' so that the second availability status is based upon a communications link therebetween. For example, when the wireless communications device 21' is moved within range of the Bluetooth™ device of the workstation 40', a communications link therebetween may be established. The second availability status is based upon the presence of this Bluetooth™ communications link. Therefore, when the first wireless communications device 21' is moved beyond range of Bluetooth™ communications, the communications link is severed, and the second availability status is changed. As shown in FIG. 3, the wireless communications device 21' is communicating with the workstation 40' via a Bluetooth™ link and broadcasting a availability message based thereon to the wireless communications network 35'. The wireless communications network 35' is in turn selectively broadcasting the second availability message to the second wireless communications device 36'. The second wireless communications device 36' displays the status of Bob Jones on the display 37' as being "In Office, Available" based upon the Bluetooth™ communications link. When this link is severed, the first wireless communications device 21' may transmit a availability status of "Unavailable" to the network.

It should also be appreciated that the second availability status need not be based upon an actual Bluetooth™ communications link, but may instead be based upon detection of the Bluetooth™ signal without the establishment of a communications link.

Referring again to FIG. 2, an accelerometer 30' may be carried by the housing and may be coupled to the processor 22'. The processor 22' may then be configured to determine the second availability status based upon the accelerometer 30'. For example, if the accelerometer 30' detects that the wireless communications device 21' is accelerating and thus in a car, bus, or train, the processor 22' may determine the second availability status based thereupon. For example, the wireless communications device 21' may be programmed to broadcast an unavailable availability status to the wireless communications network 35' when it (and therefore the user) is in a car or a train. It should be understood that the processor 22' may determine the second availability status based upon more than one of the Bluetooth m device 28', the GPS receiver 29', and the accelerometer 30'.

In some applications, the processor 22' of the wireless communications device 21' may change an availability field or a status field in an application stored in the memory 26' of the device or being executed. For example, the processor 22' may change a status or an availability of the device on an instant messaging client based upon an availability detector, such as the NFC device 25', Bluetooth device 28', or accelerometer 30', as described above.

A non-limiting example of various functional components that can be used in the example mobile wireless communications device 21 or 21' is further described in the example below with reference to FIG. 10. New reference numerals are used. Device 100 is an example embodiment of devices 21, 21' and 36, 36'. The device 100 illustratively includes a housing 120, a keyboard 140 and a display 160. The display 160 may comprise a full graphic LCD and may be touch sensitive as an input device. Other types of output devices may alternatively be used. A microprocessor 180 is contained within the housing 120 and is coupled between the keypad 140 and the display 160. This device 180 is typically a microprocessor chip contained on a circuit board in the housing 120. If the display is a touch-activated display, the keypad 140 may not be necessary. The processing device 180 controls the operation of the display 160, as well as the overall operation of the mobile device 100, in response to actuation of keys on the keypad 140 by the user.

The housing 120 may be elongated vertically, or may take on other sizes and shapes (including clamshell housing structures). The keypad may include a mode selection key, or the device may include other hardware or software for switching between text entry and telephony entry.

Figure 10:
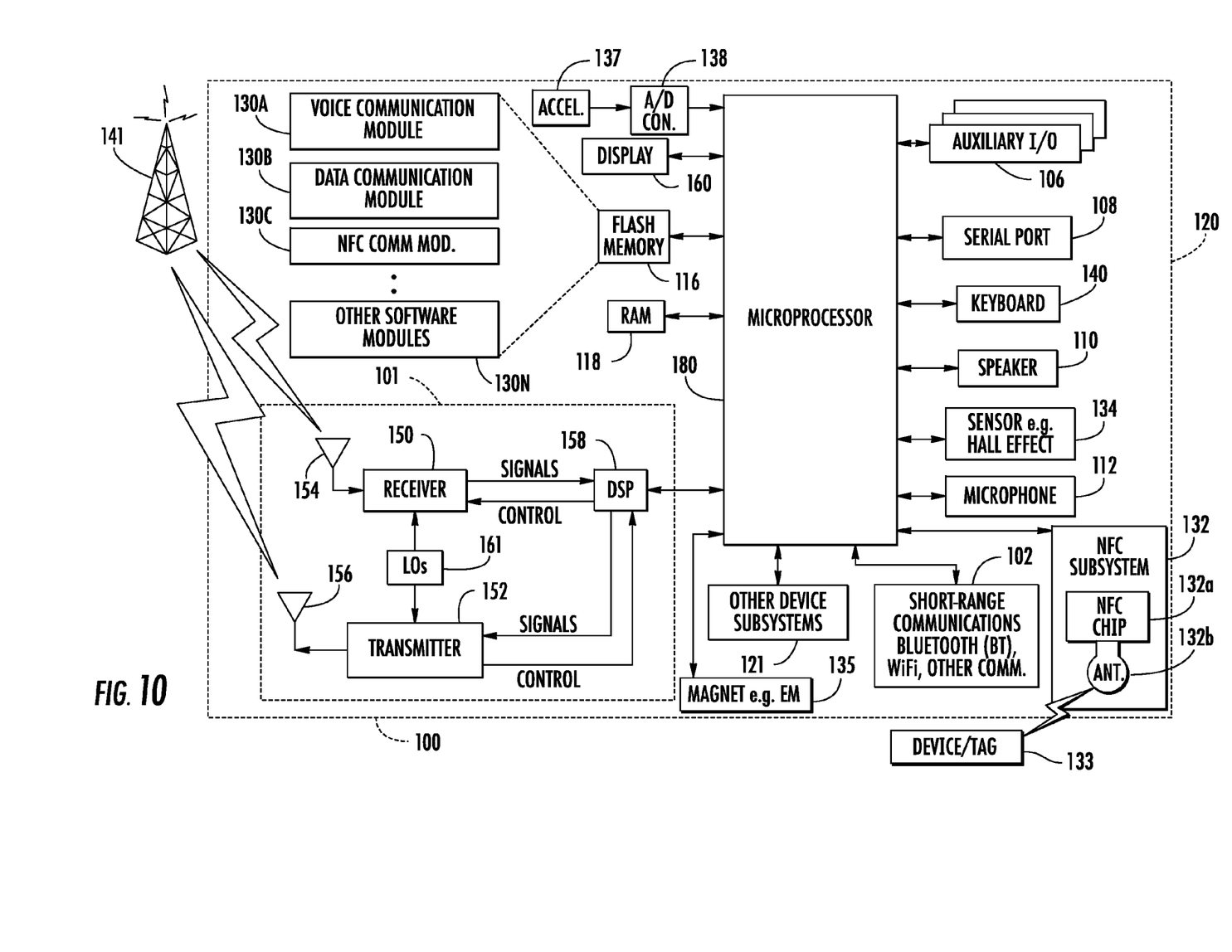
FIG. 10 is a high-level block diagram showing basic components of a portable wireless communications device that can incorporate the functionality for either device-to-device communication or a device-tag communication in accordance with a non-limiting aspect as shown in FIGS. 1-8.

In addition to the processing device 180, other parts of the mobile device 100 are shown schematically in FIG. 10. These include a communications subsystem 101; a short-range communications subsystem 102; the keypad 140 and the display 160, along with other input/output devices 106, 108, 110 and 112; as well as memory devices 116, 118 and various other device subsystems 121. The mobile device 100 is in this example a two-way RF communications device having voice and data communications capabilities using RF circuitry. In addition, the mobile device 100 has the capability to communicate with other computer systems via the Internet. The short-range communications subsystem 102 includes a Bluetooth™ communications module for establishing a Bluetooth™ wireless connection and other communications modules such as an infrared module or device, WiFi circuit and module, and associated components and circuits as part of RF circuitry.

Operating system software executed by the processing device 180 may be stored in a persistent store, such as the flash memory 116, or may be stored in other types of memory devices, such as a read only memory (ROM) or similar storage element. In addition, system software, specific device applications, or parts thereof, may be temporarily loaded into a volatile store, such as the random access memory (RAM) 118. Communications signals received by the mobile device may also be stored in the RAM 118.

The processing device 180, in addition to its operating system functions, enables execution of software applications 130a-130n on the device 100. A predetermined set of applications that control basic device operations, such as data and voice communications 130a and 130b, may be installed on the device 100 during manufacture. A Near Field Communications module 130C is also installed as illustrated.

The NFC communications module 130c as a software module cooperates with the microprocessor 180 through the flash memory 116. The microprocessor 180 operates also with the NFC subsystem 132 that includes a NFC chip 132a and antenna 132b that communicates with another device/tag 133 such as the type shown in FIGS. 1-9. The NFC communications module 130c allows the microprocessor to control the NFC subsystem 132, which includes the NFC chip 132a and antenna 132b that is tuned typically for 13.56 MHz. The NFC chip 132a could be, for example, a PN531 microcontroller-based transmission module from the Phillips Semiconductor Branch of Koninklijke Phillips Electronics N.V. When the NFC chip is a PN531 module, the NFC chip 132a could include analog circuitry and a contact list Universal Asynchronous Receiver Transmitter (UART), a core and a set of host interfaces. The analog circuitry could include an output driver, an integrated demodulator, a bit decoder, a mode detector and an RF-level detector. The contact list UART could include elements for data processing, Cyclical Redundancy Checking (CFC), parity generation, framing generation and check bit coding and decoding. The core typically includes an 80051 microcontroller, 32 Kbyte of ROM and one Kbyte of RAM. A set of host interfaces can interface with the microprocessor and interface according to such known standards as I2C, serial UART, SPI and USB.

There is also illustrated the magnetic sensor 134 that could be formed as a Hall Effect sensor and is connected to the microprocessor 180. It includes the various components that operate as a Hall Effect sensor, including any necessary coils or other circuits. There is also illustrated a magnet 135 that, in one example, is formed as an electromagnet and operates with the microprocessor to allow a different communications pathway using electromagnetic energy that is changed to correspond to changing data. The electromagnet 135 operates similar to the magnet 24 as shown in the mobile wireless communications device in FIGS. 1-9, but operates, in one example, to form another communications protocol pathway. This electromagnet 135 has different functions, including working as an active or passive device in association with other components of the device 100 as illustrated. For example, when the electromagnet 135 is used in place of an installed magnet (non-electromagnetic) in the devices of FIG. 10, a pulse of energy is delivered to the Hall Effect sensor in the other device. The other device receives the pulse and establishes a Bluetooth™ connection without going through activation of the NFC circuit. A WiFi connection, for example, in the alternative is established if a Bluetooth™ connection is not established. Other software modules 130n include software that interoperates with the magnetic sensor 134 and any magnet or electromagnet 135 or other magnetic circuitry that are included within the overall electromagnet 135. In accordance with various embodiments, the magnetic sensor 134 is optional.

An accelerometer 137 and an analog/digital converter 138 are connected to the microprocessor 180 as illustrated and allow another implementation of the NFC automatic tag detection (and automatic peer-to-peer detection). The accelerometer 137 recognizes the tapping of a communications device against a tag or another device, i.e., recognizes the vibrations. Instead of using the Hall Effect sensors and magnets to wake up the NFC circuit, the circuit uses tap recognition, for example, as a vibration sensor and accelerometer in this example. It should be understood that when the device is tapped against another object, for example, an NFC tag, a profile is generated as a matter of certain accelerometer parameters being met or exceeded. If the profile is compared against a known tap profile, it will wake the NFC circuit and initiate communication. In other embodiments, the accelerometer could be part of a motion sensor system and other motion sensor systems other than an accelerometer could be used such as a cadence sensor or cadence detection system.

An accelerometer comprises a sensor which converts acceleration from motion (e.g., movement of the communications device or a portion thereof due to the strike force) and gravity which are detected by a sensing element into an electrical signal (producing a corresponding change in output) and is available in one, two or three axis configurations. Accelerometers may produce digital or analog output signals depending on the type of accelerometer. Generally, two types of outputs are available depending on whether an analog or digital accelerometer is used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface. The embodiment shown in FIG. 10 illustrates an analog output into the A/D converter 138. The output of an accelerometer is typically measured in terms of the gravitational acceleration constant at the Earth's surface, denoted g, which is approximately 9.81 m/s$^2$ (32.2 ft/s$^2$) as the standard average. The accelerometer may be of almost any type including, but not limited to, a capacitive, piezoelectric, piezoresistive, or gas-based accelerometer. The range of accelerometers varies up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland.

The operational settings of the accelerometer, in one example, are controlled using control signals sent to the accelerometer via a serial interface. In one illustrated example, the microprocessor determines the motion detection in accordance with the acceleration measured by the accelerometer. Raw acceleration data measured by the accelerometer, in another example, is sent to the microprocessor via a serial interface where motion detection is determined by the operating system or other software module. In other embodiments, a different digital accelerometer configuration could be used, or a suitable analog accelerometer and control circuit could be used.

In addition, a personal information manager (PIM) application may be installed during manufacture. The PIM is capable of organizing and managing data items, such as email, calendar events, voice mails, appointments, and task items. The PIM application is also capable of sending and receiving data items via a wireless network 141. The PIM data items are seamlessly integrated, synchronized and updated via the wireless network 141 with the device user's corresponding data items stored or associated with a host computer system.

Communication functions, including data and voice communications, are performed through the communications subsystem 101, and possibly through the short-range communications subsystem 120, which are part of RF circuitry contained on a circuit board typically as shown by the outline. The communications subsystem 101 includes a receiver 150, a transmitter 152, and one or more antennae 154 and 156. In addition, the communications subsystem 101 also includes a processing module, such as a digital signal processor (DSP) 158, and local oscillators (LOs) 161 as part of RF circuitry in this example. The specific design and implementation of the communications subsystem 101 is dependent upon the communications network in which the mobile device 100 is intended to operate. For example, the mobile device 100 may include a communications subsystem 101 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be used with the mobile device 100.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically utilizes a subscriber identity module, commonly referred to as a SIM card, in order to operate on a GPRS network.

When required network registration or activation procedures have been completed, the mobile device 100 sends and receives communications signals over the communication network 141. Signals received from the communications network 141 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communications functions, such as demodulation and decoding. In a similar manner, signals to be transmitted to the network 141 are processed (e.g., modulated and encoded) by the DSP 158 and are then provided to the transmitter 152 for digital to analog conversion, frequency up conversion, filtering, amplification and transmission to the communication network 141 (or networks) via the antenna 156.

In addition to processing communications signals, the DSP 158 provides for control of the receiver 150 and the transmitter 152. For example, gains applied to communications signals in the receiver 150 and transmitter 152 may be adaptively controlled through automatic gain control algorithms implemented in the DSP 158.

In a data communications mode, a received signal, such as a text message or web page download, is processed by the communications subsystem 101 and is input to the processing device 180. The received signal is then further processed by the processing device 180 for an output to the display 160, or alternatively to some other auxiliary I/O device 106. A device user may also compose data items, such as e-mail messages, using the keypad 140 and/or some other auxiliary I/O device 106, such as a touchpad, a trackball, a trackpad, a rocker switch, a thumb-wheel, or some other type of input device. The composed data items may then be transmitted over the communications network 141 via the communications subsystem 101.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 100. In addition, the display 160 may also be used in voice communications mode, for example to display the identity of a calling party, the duration of a voice call, or other voice call related information and whether there are NFC communications or a Bluetooth™ connection.

Any short-range communications subsystem enables communication between the mobile device 100 and other proximate systems or devices, which need not necessarily be similar devices. For example, the short-range communications subsystem may include an infrared device and associated circuits and components as described above, or a Bluetooth™ communications module to provide for communication with similarly-enabled systems and devices as well as the NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A wireless communications system comprising:
   a wireless communications network; and
   a plurality of wireless communications devices, each configured to communicate via said wireless communications network, at least one of said plurality of wireless communications devices comprising
      a portable housing,
      a wireless transceiver carried by said portable housing,
      a Near Field Communications (NFC) device carried by said portable housing,
      a wireless-based, availability detector carried by said portable housing, and
      a processor carried by said portable housing and configured to
         determine a first availability status based upon said NFC device at a first time,
         activate said wireless-based, availability detector based upon said NFC device to thereby determine a second availability status based upon said wireless-based, availability detector at a second time after the first time, and
         communicate the first availability status and the second availability status to said wireless communications network via said wireless transceiver.

2. The wireless communications system according to claim 1, wherein said wireless communications network is configured to communicate the first availability status and the second availability status to at least one other wireless communications device.

3. The wireless communications system according to claim 1, wherein said wireless communications network is configured to communicate the first availability status and the second availability status to a social networking site.

4. The wireless communications system according to claim 1, further comprising at least one NFC tag cooperating with said NFC device carried by said portable housing; and wherein the first availability status is based upon a momentary proximity between said at least one NFC tag and said NFC device carried by said portable housing.

5. The wireless communications system according to claim 1, wherein said wireless-based, availability detector comprises a Global Positioning Satellite (GPS) receiver so that the second availability status is based upon at least one geospatial position of said wireless communications device.

6. The wireless communications system according to claim 5, wherein said at least one wireless communications device further comprises at least one input device carried by said portable housing; and wherein said wireless-based, availability detector is configured to cooperate with said at least one input device to permit association of the at least one geospatial position with the second availability status.

7. The wireless communications system according to claim 1, wherein said wireless-based, availability detector comprises a Bluetooth device.

8. The wireless communications system according to claim 7, further comprising at least one other Bluetooth device cooperating with said Bluetooth device; and wherein the second availability status is based upon a communications link between said Bluetooth device and said at least one other Bluetooth device.

9. The wireless communications system according to claim 1, further comprising an accelerometer carried by said housing and coupled to said processor; and wherein said processor is also configured to determine the second availability status based upon said accelerometer.

10. A wireless communications device for communication with a wireless communications network comprising:
    a portable housing;
    a wireless transceiver carried by said portable housing;
    a Near Field Communications (NFC) device carried by said portable housing;
    a wireless-based, availability detector carried by said portable housing; and
    a processor carried by said portable housing and configured to
       determine a first availability status based upon said NFC device at a first time,
       activate said wireless-based, availability detector based upon said NFC device to thereby determine a second availability status based upon said wireless-based, availability detector at a second time after the first time, and communicate the first availability status and the second availability status to said wireless communications network via said wireless transceiver.

11. The wireless communications device according to claim 10, wherein said wireless-based, availability detector comprises a Global Positioning Satellite (GPS) receiver; and wherein the second availability status is based upon at least one geospatial position of said wireless communications device.

12. The wireless communications device according to claim 11, wherein said at least one wireless communications device further comprises at least one input device carried by said portable housing; and wherein said wireless-based, availability detector is configured to cooperate with said at least one input device to permit association of the at least one geospatial position with the second availability status.

13. The wireless communications device according to claim 10, wherein said wireless-based, availability detector comprises a Bluetooth device.

14. The wireless communications system according to claim 13, wherein the second availability status is based upon a communications link between said Bluetooth device and at least one other Bluetooth device.

15. The wireless communications device according to claim 13, further comprising an accelerometer carried by said housing and coupled to said processor; and wherein said processor is also configured to determine the second availability status based upon said accelerometer.

16. A method of using a wireless communications device comprising a processor, and a wireless transceiver, a Near Field Communications (NFC) device, and a wireless-based availability detector coupled thereto, the method comprising:

determining, using the processor, a first availability status based upon the NFC device at a first time;

activating, using the processor, the wireless-based, availability detector based upon the NFC device to thereby determine a second availability status based upon the wireless-based, availability detector at a second time after the first time; and communicating the first availability status and the second availability status to a wireless communications network via the wireless transceiver.

17. The method according to claim 16, wherein the first availability status is based upon a momentary proximity between at least one external NFC tag and the NFC device.

18. The method according to claim 16, wherein the wireless-based, availability detector comprises a Global Positioning Satellite (GPS) receiver; and wherein the second availability status is based upon at least one geospatial position of the wireless communications device.

19. The method according to claim 18, wherein the wireless-based, availability detector is configured to cooperate with at least one input device to permit association of the at least one geospatial position with the second availability status.

20. The method according to claim 16, wherein the wireless-based, availability detector comprises a Bluetooth device; and wherein the second availability status is determined based upon a communications link between the Bluetooth device and at least one external Bluetooth device.

21. The method according to claim 16, wherein the second availability status is also determined based upon an accelerometer.

* * * * *